United States Patent [19]
Ferraris et al.

[11] Patent Number: 5,203,512
[45] Date of Patent: Apr. 20, 1993

[54] PROCESSING ADDITIVE FOR HIGH-PRESSURE ROLL PRESS PROCESS OF FORMING FINISH GRIND CEMENT

[75] Inventors: Chiara F. Ferraris, Columbia; Ellis M. Gartner, Silver Spring; David F. Myers, Columbia, all of Md.

[73] Assignee: W. R. Grace & Co.-Conn., New York, N.Y.

[21] Appl. No.: 832,512

[22] Filed: Feb. 7, 1992

[51] Int. Cl.$^5$ .......................... C04B 7/14; B02C 23/00
[52] U.S. Cl. .......................... 241/16; 241/15; 106/724; 106/728
[58] Field of Search .......................... 241/15, 16, 22; 106/724, 727, 728

[56] References Cited
U.S. PATENT DOCUMENTS
4,711,401 12/1987 Serafin .................................. 241/16

Primary Examiner—Douglas D. Watts
Attorney, Agent, or Firm—Howard J. Troffkin

[57] ABSTRACT

An improved high-pressure roll press process for forming finish ground cement is disclosed and is achieved by treating the material entering the roll press with a small amount of a hydroxyl or alkoxyl compound selected from lignin, phenol or monopropylene glycol or mixtures thereof.

8 Claims, 1 Drawing Sheet

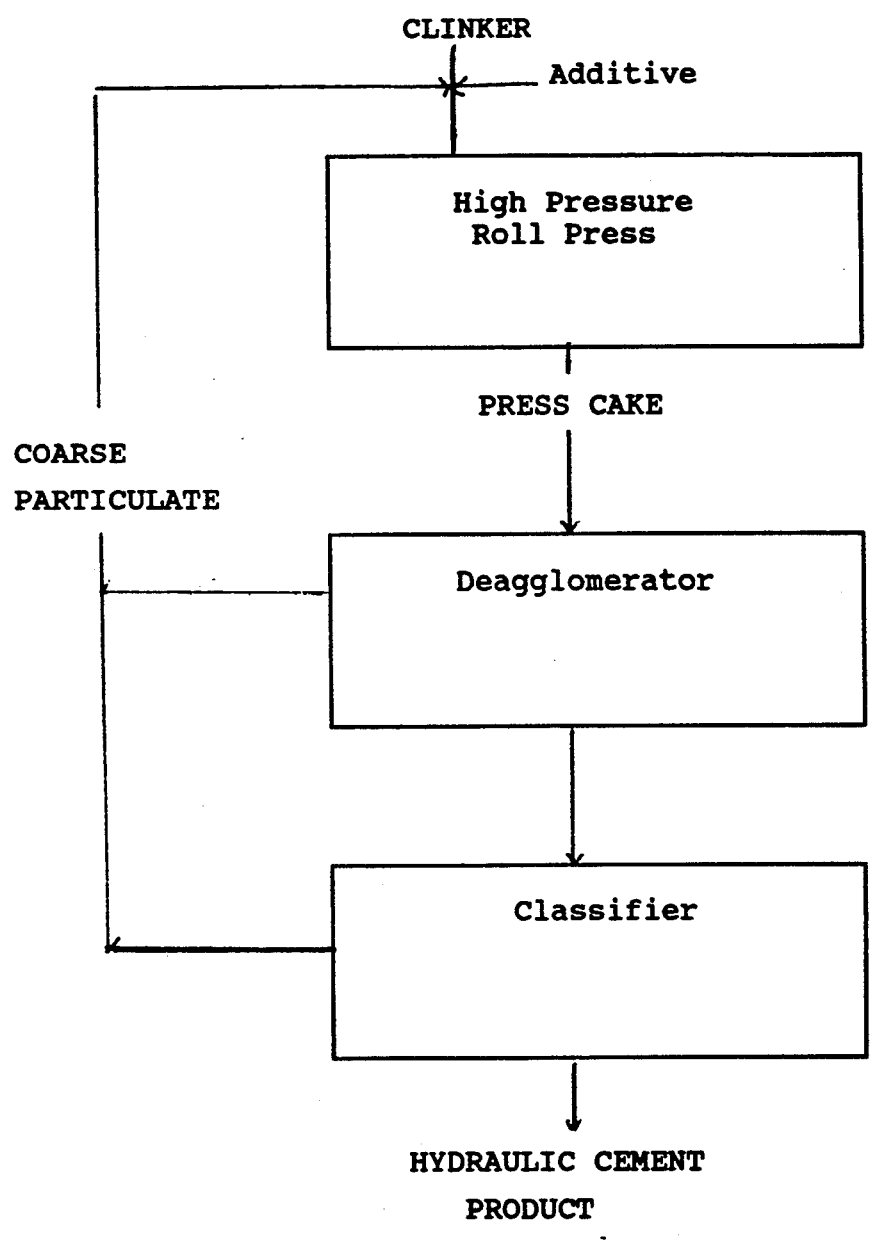

PROCESSING ADDITIVE FOR HIGH-PRESSURE ROLL PRESS PROCESS OF FORMING FINISH GRIND CEMENT

BACKGROUND OF THE INVENTION

The present invention is directed to an improved method of forming hydraulic cement powder product using a high pressure roll press.

Hydraulic cements, such as portland cement, are prepared by sintering a mixture of components which normally include calcium carbonate (as limestone), aluminum silicate (as clay or shale), silicon dioxide (as sand), and miscellaneous iron oxides. During the sintering process, chemical reactions take place to produce hardened nodular products, commonly called clinkers. The clinkers are composed of the reaction products of calcium oxide with acidic components which primarily provide tricalcium silicate ($C_3S$), dicalcium silicate ($C_2S$), tricalcium aluminate ($C_3A$) and a ferrite solid solution phase approximating tetracalcium aluminoferrite ($C_4AF$). The specifics of the raw materials are adjusted to produce clinkers having the desired composition for cement powder formation. Once the clinker material has cooled, it is pulverized, normally with a small amount of gypsum, to provide a fine, homogeneous powdery hydraulic cement product.

The conventional means of producing cement powder is to pulverize a clinker/gypsum mixture using a ball mill. The clinker and gypsum are introduced into a tubular ball mill. Due to the nature of a ball mill, the materials contained in the mill are continuously subjected to impact forces. Such forces aid in churning-up the powdery product and do not permit the powder to combine into large agglomerates. The powder leaving the ball mill is usually fed into a separator which classifies the material by means of its rate of settling in air; the larger particles, which settle most rapidly, being returned to the ball mill for further grinding, and the smaller particles being collected as finished cement.

Due to the inefficiency of action of the ball mill grinding process, a large amount of energy is required to properly mill the material. For example, energy requirements for finish grinding by ball mill may be as high as 75 kWh/ton of product. Part of this energy is used in the continuous impacting of the powdery product prior to its removal from the mill. To further aid in such removal and, thereby, improve on the efficiency of the milling process, a variety of materials commonly known as grinding aids have been used in ball mill operations. Typical grinding aids include glycols, alkanolamines, aromatic acetates and the like. They serve to fluidify the cement powder in the mill and thereby allow more rapid transit of the finer particles out of the system.

Recently, powdery hydraulic cement has been formed from clinker by passing the clinker (alone or with gypsum) through a high pressure roll press. The raw material is introduced, via a hopper, to a set of rollers operated at pressures in the neighborhood of 3000 atm (300 MPa) to exert a squeezing force on the clinker to cause it to fracture into a powder. The powdery product of the roll press is in the form of an agglomerated cake ("press cake"). The press cake is deagglomerated by passing through a breaker device, such as a hammer mill, and then to a classifier which returns coarse material to the press. The coarse material results from either (a) partial breakage of clinker (inefficiency of roll press) or (b) partial breakage of the agglomerated press cake material (inefficiency of breaker device).

Although the high pressure roll press is more efficient in energy consumption with respect to the ball mill process, it is desired to improve this newer method by increasing the efficiency of the press and/or breaker device so that, in a given pass-through, there is a higher amount of desired fine particulate produced. Conversely, there would be less coarse material ejected from the classifier and returned to the roll press.

SUMMARY OF THE INVENTION

It has been unexpectedly found that hydraulic cement powder can be more efficiently formed from clinker raw material using a high pressure roller press by treating the clinker raw material with a small amount of certain hydroxyl or alkoxyl group containing compound prior to subjecting it to the roll press.

DESCRIPTION OF THE DRAWING

The FIGURE is a block diagram of a high pressure roll press process to form hydraulic cement powder product from clinker raw material.

DETAILED DESCRIPTION

The present invention is directed to an improved method of forming hydraulic cement powder product from clinker raw material. Specifically, the invention is directed to improving the efficiency of the high pressure roll press process for converting clinker raw material into hydraulic cement powder product.

The term "cement" and "hydraulic cement", as used in the present description and in the appended claims, designate a powdery material which, when mixed with water, is capable of curing to a hard, solid material. The cement is formed from clinker raw material, as described above, either alone or mixed with other components, such as gypsum. Hydraulic cements, when mixed with water form a "paste" which hardens slowly; when mixed with water and fine aggregate (e.g. sand) form a "mortar"; and when mixed with water and fine and coarse aggregate (e.g. sand and stone) form a "concrete" which is a rock-hard product. Hydraulic cements may vary in the particular composition based on end-use application and upon specific specifications established in each country (See, *Cement Standards of the World*, Cembureau, Paris, FR). In the United States, the American Society for Testing and Materials (ASTM), as well as other agencies, have established certain basic standards for cement based on the principal chemical composition of the clinker raw material used to form the cement. For example, Portland cement is a common hydraulic cement used in the construction industry and meets the specifications of ASTM C-150.

The present process requires introducing clinker raw material of the desired composition to a high pressure roll press. The clinker may be mixed with other conventional materials, such as gypsum, before being subjected to the roll press. For example, gypsum may be added in amounts of up to about 15 percent although high quality cement is normally made with from about 2 to about 10, preferably about 3 to 7 percent by weight of gypsum based on the total raw material used to form the cement powder product.

The clinker raw material is introduced (via a hopper or the like) between the rollers of the high pressure roll press. The rollers subject the clinker nodules to high pressure (conventionally about 2500 to 3500 atm) to squeeze the nodules causing them to splinter and disintegrate. The product of the roll press is a press cake composed of particulates. The present high pressure roll press means of forming cement powder is distinctly different from that of the more conventional ball mill methods. In the present means the clinker nodules are subjected to a squeezing action and to form an agglomerated cake product. In the ball mill, the disintegration of the clinker is caused by impact forces and the product is a powdery product not allowed to form a cake due to the ball action within the mill.

In the present high pressure roll press method, the achieved press cake is deagglomerated by a low-energy impact device such as a hammer mill. The resultant powder is then passed through a classifier as a means to separate the desired fine particulate product from the larger material which must be returned to the roll press. The larger or coarse material requiring recycling is composed of raw material which did not disintegrate sufficiently during its pass through the high pressure roll press as well as particulates which remained agglomerated after passage through the deagglomerator, and, therefore, were also rejected by the classifier.

It has now been unexpectedly found that improvement in the high pressure roll press process of forming hydraulic cement powder can be achieved by treating the clinker raw material with certain hydroxyl or alkoxyl containing compounds, as fully described herein below. It has been found that the amount (percentage) of fine particulate cement powder obtained from the deagglomeration on a single pass basis is increased when the clinker raw material is treated according to the present invention. Stated another way, the amount of material subjected to recycling from the disagglomerator or deagglorerator on a single pass basis is decreased and thereby permits higher levels of clinker to be introduced and processed by the presently improved method.

The present invention requires the blending of at least one hydroxyl or alkoxyl containing organic compound with the clinker raw material suitable to form the desired cement recipe prior to its introduction into the roll press. The organic hydroxyl containing compound may be an aromatic compound such as phenol, cresol and the like, or an aliphatic compound, such as diethylene glycol, monopropylene glycol and the like, or mixtures thereof. The organic alkoxyl containing compound found useful is lignin and its salts such as lignin sulfonate. Lignin is readily obtained from the sulfate and soda paper pulp processes. It is a mixture of material which contain a high content of methoxy groups. The preferred additives are phenol, monopropylene glycol and lignin.

Although certain hydroxyl containing compounds have been equated with other agents as grinding aids for ball mill applications where impact forces are encountered, all of these agents have been found not to enhance the performance of the present roll press process. The present improved process is unexpectedly achieved by the presence of the disclosed additives as part of the raw material being processed by roll press to provide hydraulic cement powder.

The subject additives can be mixed with the clinker nodule raw material in any convenient manner. The means of addition of the subject additive is not critical to the invention, as long as the additive is well dispersed among the other raw materials. The preferred manner is by applying (e.g. spraying) an aqueous solution of the present additive onto the raw material. The aqueous solution may contain from about 5 to 95 (preferably 30-80) weight percent of the additive or mixture of same. The additive is applied at rates to provide dosages of from 25 to 2500 g per metric ton of clinker raw material. It has been found that preferred dosages of from about 100 to 1000 g per metric ton provide enhanced efficiency to the process. The particular dosage can be determined by minor experimentation and will depend upon the raw material composition and the particular additive or mixture used.

The clinker raw material may be composed of clinker nodules alone, clinker nodules combined with other materials, such as gypsum, limestone, slag, pozzolans and the like or other dry materials commonly used for the production of cement. The particular raw material composition will depend upon the particular cement product desired, as is well known to the processor. Other additives may also be introduced as part of the raw material to provide a hydraulic cement product having certain particular desired properties. For example, the raw material may further contain cement water reducing agents, such as naphthalene sulfonate-formaldehyde and the like; set retarders, such as sugars and the like; set accelerators such as calcium nitrite and the like; and cement strength enhancers, such as microsilicas (silicon fume), rice hull ash and the like. These materials may be added separately or with the subject additive to enhance the process.

The following examples are given for illustrative purposes only and are not meant to be a limitation on the appended claims. All parts and percentages are by weight unless otherwise indicated.

The high pressure roll press process, composed of subjecting clinker raw material to the high pressure squeezing action of a roll press, deagglomeration by a hammer mill and classification of the resultant particulate to separate fines from coarse or non-deagglomerated material, was replicated using a static system. The system utilized, as fully described below, a static press to reproduce the squeezing action associated with the roll press, an impact hammer/sieve separator to reproduce the hammer mill forces, and final classification by a high-efficiency air of the fine fraction from the sieve separation a classifier to attain the desired product.

Specifically, a stainless steel cylindrical die was composed of a tubular cylinder, a solid cylinder of a diameter equal to the inner diameter of the tubular cylinder and a removable base plate. This die is used in combination with a high pressure press capable of exerting 300 MPa on the material being squeezed within the die. The formed press cake is removed from the die by removing the base plate, replacing it with a stainless steel cup and forcing the piston to the base of the tubular cylinder to cause the formed press cake to drop into the cup.

The samples were deagglomerated by placing a stainless steel plate on top of the press cake disk and subjecting it to the hammer force of a four (4) lb. weight dropping from 33.7 cm height three times. Removing fines by passing the material through a No. 8 U.S. Standard Sieve and again subjecting the retained material to the deagglomeration and separation process. The retained coarse material was weighed and compared to the weight of the starting material, giving an index of press cake strength and ability to deagglomerate. The fines attained from deagglomeration were subjected to a classifier which separated out material of less than 30 micron dia. (useful as cement powder). The coarse material from the classifier was combined with the coarse material obtained from the simulated hammer mill and returned (with fresh make-up clinker) to the die cylinder for the next cycle. The cycling was done seven times.

The effectiveness of crushing the clinker and deagglomeration of the press cake was measured by the amount of a coarse material retained on the sieve after complete hammer action of each pass with the average value of the last five cycles divided by the batch size.

300 parts of clinker nodules obtained from a commercial cement factory which is suitable for forming portland cement and having cement compound constituent analysis of 78.6% $C_3S$; 0.6% $C_2S$; 0.9% $C_3A$; 15.9% $C_4AF$, 19 parts of terra alba gypsum were mixed and sprayed with an aqueous solution having 10 wt. percent lignin to provide a uniform mixture. The lignin was applied at the rate of 650 g per metric ton. 150 parts of this clinker raw material was introduced into the cylinder die and processed in the manner described above. The retained material was 9.8 percent by weight and the fine powder obtained from the classifier had a median particle size of 11.0 micron and a Blaine value of 280 $m^2/kg$.

The procedure described above was conducted using phenol instead of lignin. The rate of application was 200 g/metric ton. The retained material exhibited low levels of coarse particulate of 7.0 percent by weight and the fine powder obtained from the classifier had a median particle size of 11.3 and a Blaine fineness value of 287 $m^2/kg$.

The procedure described above is also conducted using monopropylene glycol instead of lignin. The product obtained also exhibits low levels of retained coarse particulate, low median particle size, and high Blaine fineness values.

We claim:

1. In a process for forming hydraulic cement powder product from clinker raw material by subjecting clinker raw material to a high pressure roll press, pulverizing the clinker raw material within the roll press to form a press cake, disintegrating the press cake and removing the coarse particulate, the improvement comprising applying to the clinker raw material an aqueous solution having from 5 to 95 weight percent of an organic hydroxyl or methoxy containing additive therein selected from phenol, propylene glycol, lignin or mixtures thereof at a rate of from about 25 to 2500 gram of additive per metric ton of clinker raw material.

2. The process of claim 1 wherein the additive is phenol.

3. The process of claim 1 wherein the additive is monopropylene glycol.

4. The process of claim 1 wherein the additive is lignin.

5. The process of claim 1 wherein the additive containing aqueous solution further contains conventional cement admixture agents.

6. The process of claim 2 wherein the additive containing aqueous solution further contains conventional cement admixture agents.

7. The process of claim 3 wherein the additive containing aqueous solution further contains conventional cement admixture agents.

8. The process of claim 4 wherein the additive containing aqueous solution further contains conventional cement admixture agents.

* * * * *